United States Patent [19]

Merrison et al.

[11] Patent Number: 4,978,897

[45] Date of Patent: Dec. 18, 1990

[54] MOTOR CONTROLLER WITH AN IMPROVED STOPPING TECHNIQUE

[75] Inventors: John C. Merrison, Wauwatosa; Robert J. DeLange, St. Francis; Timothy M. Rowan, Wauwatosa, all of Wis.

[73] Assignee: Allen-Bradley Company, Inc., Milwaukee, Wis.

[21] Appl. No.: 514,896

[22] Filed: Apr. 26, 1990

[51] Int. Cl.⁵ .............................................. H02P 3/18
[52] U.S. Cl. ................................... 318/268; 318/763; 318/368
[58] Field of Search ............... 318/341, 362, 366, 368, 318/369, 375, 376, 373, 254, 268, 269, 273, 278, 63, 66, 74, 75, 757–762, 763, 764, 798, 729, 461; 388/809, 817, 846, 917

[56] References Cited

U.S. PATENT DOCUMENTS

| | | | |
|---|---|---|---|
| 3,376,485 | 4/1968 | Shibata et al. | 318/227 |
| 3,569,809 | 3/1971 | Comer | 318/338 |
| 3,649,894 | 3/1972 | Yoneya | 318/210 |
| 3,652,924 | 3/1972 | Dieterich et al. | 323/24 |
| 3,708,734 | 1/1973 | Rowe | 381/212 |
| 3,795,850 | 3/1974 | Grygera | 318/331 |
| 4,151,453 | 4/1979 | Suzuki et al. | 318/762 |
| 4,227,129 | 10/1980 | Brooks | 318/331 |
| 4,230,979 | 10/1980 | Espelage et al. | 318/721 |
| 4,238,717 | 12/1980 | Knight et al. | 318/341 |
| 4,374,352 | 2/1983 | Webster | 318/762 |
| 4,392,098 | 7/1983 | Min | 318/758 |
| 4,459,528 | 7/1984 | Nola | 318/729 |
| 4,459,529 | 7/1984 | Johnson | 318/729 |
| 4,482,853 | 11/1984 | Bhavsar | 318/778 |
| 4,518,902 | 3/1985 | Melocik et al. | 318/373 |
| 4,556,836 | 12/1985 | Antognini | 318/696 |
| 4,607,205 | 8/1986 | Kito et al. | 318/778 |
| 4,612,490 | 9/1986 | Kagi | 318/761 |
| 4,636,936 | 1/1987 | Boyd, Jr. et al. | 318/254 |
| 4,833,386 | 5/1989 | Unsworth | 318/763 |

*Primary Examiner*—William M. Shoop, Jr.
*Assistant Examiner*—A. Jonathan Wysocki
*Attorney, Agent, or Firm*—Quarles & Brady

[57] ABSTRACT

An electric motor has first, second and third stator windings supplied by a source of alternating voltage having three phases A, B and C, respectively. A separate thyristor switch assembly couples each stator winding to an alternating voltage phase when said switch means is rendered conductive by a trigger signal. When the speed of the motor is above a first predefined level, the thyristor switch assemblies are triggered, in response to the polarity of the voltage between phases A and B being opposed to the polarity of back emf voltage induced across the third winding, to apply current through said first and second stator windings. However, when the speed of the motor is below the first predefined level, the thyristor switch assemblies are triggered, in response to the polarity of the voltage betwen phases B and C being opposed to the polarity of back emf voltage induced across the third winding, to apply current through said second and third stator windings. Subsequently when the speed of the motor further decreases below a second predefined level, current is applied through said second and third stator windings during every cycle of the voltage between phases B and C.

17 Claims, 4 Drawing Sheets

MOTOR CONTROLLER WITH AN IMPROVED STOPPING TECHNIQUE

BACKGROUND OF THE INVENTION

The present invention relates to systems for controlling the application of power to alternating current electric motors; and in particular to such devices which regulate the application of the electric power to stop the motor.

A conventional motor controller has thyristors which connect motor stator windings to alternating current supply lines. For a three-phase motor, each AC phase line usually is coupled to a separate winding within the motor by a thyristor switch formed by either a triac or a pair of inversely connected silicon controller rectifiers (SCR's). A circuit within the controller determines the proper time to trigger the thyristor switches during each half cycle of the supply line voltage. The thyristor switches are triggered in sequence as determined by the phase relationship of the voltage on each supply line. The sequence is circular in that after each iteration of triggering all of the thyristor switches, the process repeats by re-triggering them in the same order. Once a thyristor switch is triggered it remains in a conductive state until the alternating current flowing therethrough makes a zero crossing at which time it must be retriggered to remain conductive. By regulating the trigger times of the switches with respect to the zero current crossings, the intervals during which they are conductive can be varied to control the amount of voltage applied to the motor.

To start the motor, conventional motor controllers vary the thyristor switch trigger times to provide a gradual increase in the voltage. In doing so, the switches are initially triggered relatively late in each voltage half-cycle so that they are conductive for only a short period. The trigger times then become progressively earlier in each half-cycle to render the thyristor switches conductive for longer intervals and apply greater amounts of voltage to the motor until it reaches full speed.

These motor controllers often did not provide a mechanism for braking the motor when it was stopped. In response to an operator input to stop the motor, the basic controller simply disconnected the electricity allowing the motor to coast to a stop, slowed only by friction. If the motor is coupled to a mechanical load with considerable inertia, the motor and the load will continue to move for some time after the power is shut off. In many industrial applications of motors, it is important for convenience and efficient use of the driven equipment to stop this continued movement as fast as possible. Merely allowing the motor to coast to a stop was unsatisfactory. Heretofore, a mechanical brake often was coupled to the equipment and engaged when the power was turned off.

As an alternative, a direct current was sometimes applied to the stator windings of an alternating current motor to provide a braking action. In order to electrically brake an alternating current motor, it is necessary to generate a torque in the direction opposite to the direction of the the rotation of the rotor, referred to herein as "negative motor torque". In the direct current injection method of the prior art, the torque is produced by the rotor attempting to rotate in the presence of a steady magnetic field produced by the direct current applied to the stator winding. The rotating direction of the rotor's magnetization leads the direction of the magnetic field produced by the direct current through stator winding. The tendency of the rotor magnetization to align itself with the stator's magnetic field creates an alignment torque which produces a braking effect on the rotor. As is well-known, this torque is equal to the product of the stator magnetic field strength and the rotor magnetization together with the sine of the angle therebetween. More recently a stopping maneuver has been incorporated into motor controllers to create a negative motor torque by applying electricity from an alternating supply to the motor at the proper instants. After the electric current supply to motor is disconnected, the rotor magnetization starts to decay over a period of time on the order of a second or two. During this period, the rotor and its associated magnetization, rotate with respect to the stator and induce a voltage across the stator windings referred to as "back emf voltage". This voltage varies sinusoidally in time and passes through zero at the instants when the rotor magnetization is aligned with the axis of the corresponding winding. Therefore, observation of the back emf voltage, induced in the stator windings in the absence of a stator current, indicates the orientation of the rotor's magnetization.

The back emf voltage also indicates the angle between the rotor magnetization and the direction of the stator's magnetic field, if current was applied to the stator coils. Therefore, the instant to apply current pulses to the stator winding to produce a braking torque can be determined from the back emf voltage waveform across the stator windings. Specifically, a braking effect can be produced if electric current pulses are passed through the stator windings at times when the direction of the rotor magnetization is leading the direction of the magnetic field which will be produced by the stator current. The alignment torque produced by the application of the alternating current is then in a direction opposite to the rotor's rotation thereby exerting a braking torque.

Previously three-phase motor controllers sensed the back emf voltage across one stator winding of the motor. When the sensed back emf voltage and the supply voltage between the phases supplying the other two stator windings are of opposite polarity, the electricity is applied to the other two stator windings. The previous stopping maneuver applied the electric current to the same set of stator windings for a given period of time sufficient to stop the motor. U.S. Pat. No. 4,833,386 describes this technique in detail.

As the motor slowed to approximately ten percent of its full running speed, sending current through the other two windings occasionally produced a positive motor torque. Such a positive motor torque briefly accelerated the rotor of the motor prolonging the stopping time slightly. Nevertheless, the maneuver had the net effect of bringing the motor to a faster stop than merely disconnecting the electricity.

In an attempt to avoid producing an acceleration during braking, the present inventors applied the braking current through the same winding used to sense the back emf and one of the other motor windings. As with the previous technique, the current was applied in response to the sensed back emf voltage having the opposite polarity to the voltage between the supply phases for the two windings to which current is to be applied. Although the latter technique uniformly produced negative motor torque at low speed, it produced an occasional burst of positive motor torque at high speed, e.g. 90 percent of full speed.

SUMMARY OF THE INVENTION

An alternating current electric motor is stopped by disconnecting the electric current to the motor and sensing the back emf voltage produced by the gradually decaying magnetism in the rotor. In response to the sensed back emf voltage, the electric current is periodically reapplied to the motor in a manner which produces a torque that retards the movement of the rotor.

Specifically, a three-phase motor has three stator windings designated A, B, and C. The back emf voltage induced across winding C is sensed when current from a three-phase electrical supply is not flowing through winding C. Initially, electric current is applied through windings A and B whenever the voltage between the electrical supply phases for those windings is opposite in polarity to the sensed back emf voltage. When the motor is close to its full running speed, the opposing polarity condition occurs only once during several cycles of the alternating supply voltage.

As the speed decreases, the opposing polarity condition occurs more and more frequently and the current is applied through windings A and B more often. Eventually, a transition in the maneuver takes place when less than a given interval of time occurs between consecutive applications of current, thereby indicating that the speed is below a predefined level. Thereafter, current is applied through motor windings B and C whenever the voltage across the corresponding supply phases has the opposite polarity to the back emf voltage induced in winding C.

In the preferred embodiment, when the speed reduces even more and drops below a second predefined level, current is applied to the motor during every cycle of the supply voltage regardless of the back emf voltage.

A general object of the present invention is to provide a technique for electrically slowing the speed of a three-phase motor in a manner which compensates for the effects from varying motor loads.

Another object is to utilize the back emf of the motor as an indicator of the position of the rotor magnetization. In response to this indication, a determination can be made of when and how to apply electric current to the motor to create a negative motor torque.

A further object is to apply electric current to a pair of windings of the three-phase motor when the supply voltage for those windings and the back emf sensed in a winding are of opposite polarities.

Yet another object of the present invention is to select the pair of windings to which the current is applied as a function of motor speed.

DETAILED DESCRIPTION OF THE INVENTION

Figure 1:
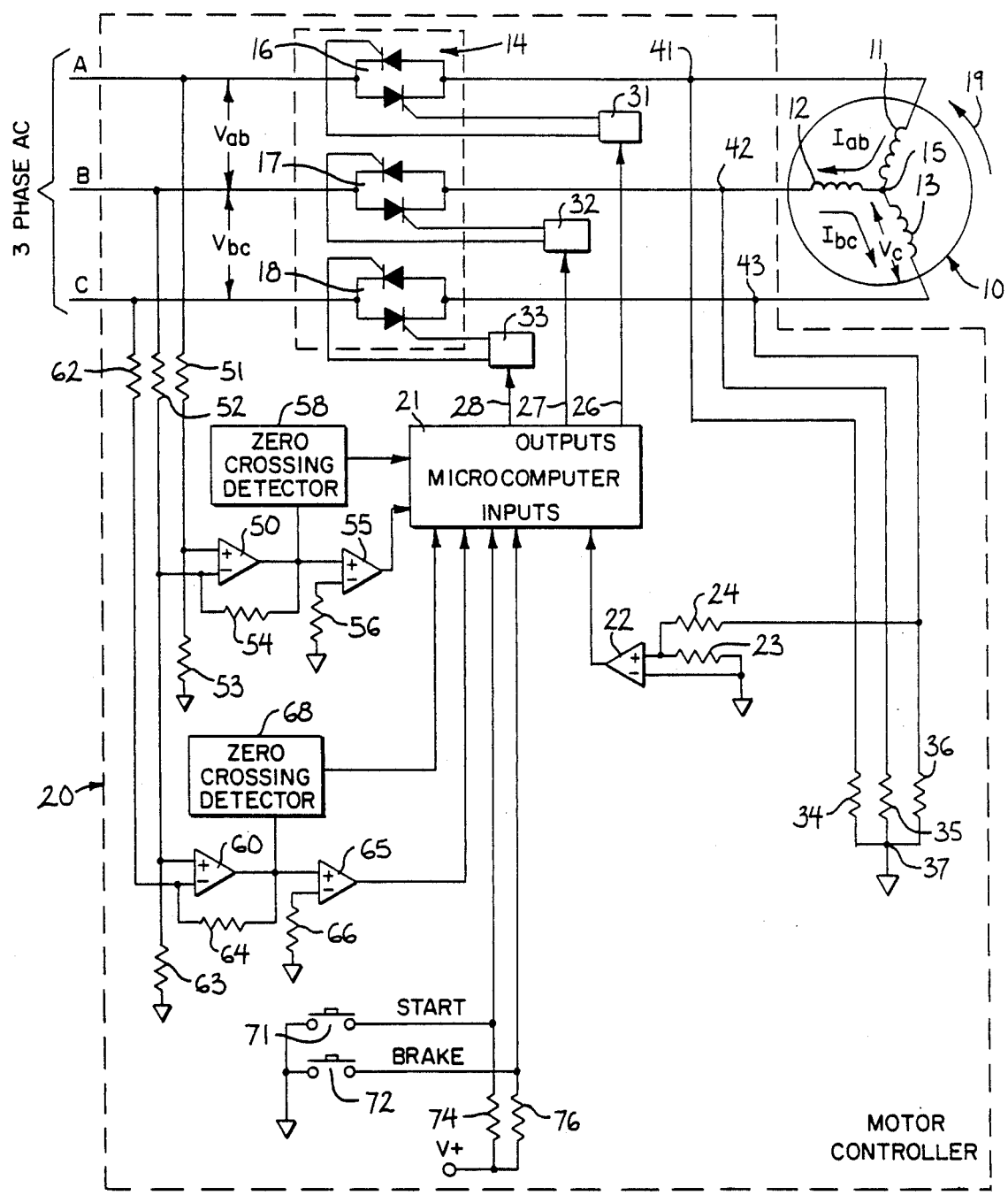
FIG. 1 is a schematic diagram of a controller for a three-phase electric motor according to the present invention.

The present invention will be described in the context of the exemplary motor controller 20 shown in FIG. 1. An alternating current electric motor 10 has three motor stator windings 11, 12 and 13, which are coupled in a Y connection at neutral node 15. Arrow 19 indicates the direction of rotation of the motor's rotor. The stator windings 11, 12 and 13 are connected to a source of three-phase electricity by a thyristor switch module 14 and three supply lines designated A, B and C. The alternating voltage in supply line A leads the voltage in the B supply line which in turn leads the C supply line voltage. The switch module 14 has three pairs 16, 17, and 18 of inverse parallel connected SCR's. The SCR's in each pair couple one of the supply lines A, B or C to a different stator winding 11, 12 or 13, respectively. Depending on the level of current to be controlled, a triac can be used in place of each pair of SCR's.

The SCR pairs 16-18 are operated by a control circuit that includes a microcomputer 21, voltage comparators 22, 55, and 65, two zero voltage crossing detectors 58 and 68, and two differential amplifiers 50 and 60 interconnected by other components as will be described. The microcomputer 21 may be one of several commercially available types which contain timer circuits, a read only memory, and a random access memory in the same integrated circuit package. The program for controlling the operation of the motor controller 20 is stored in the read only memory and will be described in greater detail with respect to the operation of the motor controller.

The microcomputer 21 has a parallel output port with three lines 26, 27, and 28. One output line 26 is coupled by a pulse transformer 31 to the gate terminals of the first pair of SCR's 16 for electricity supply line A. The other trigger output lines 27 and 28 are coupled by similar pulse transformers 32 and 33 to the gate terminals of the second and third SCR pairs 17 and 18, respectively, for electricity supply lines B and C. The microcomputer 21 generates properly timed thyristor trigger pulses on the three lines 26, 27, and 28. Each trigger pulse has a relatively short duration being just long enough to place the corresponding SCR in a conductive state, in which it remains until the magnitude of the alternating current flowing through the SCR goes to zero.

The A and B phase supply lines are separately coupled by another pair of resistors 51 and 52 to the non-inverting and inverting inputs, respectively, of the first differential amplifier 50. The non-inverting input also is coupled to the circuit ground by resistor 53. A feedback resistor 54 is connected between the output of the first differential amplifier 50 and its inverting input. The output of the first differential amplifier 50 is connected to the non-inverting input of the second voltage comparator 55 whose inverting input is coupled to ground by resistor 56. The output of the second voltage comparator 55 is connected to one parallel input port line of the microcomputer 21. The level of this input indicates the polarity with respect to ground of the voltage Vab between the A and B phase supply lines.

The output of the first differential amplifier 50 also is connected to the first zero crossing detector 60 which senses when the voltage output of the first differential amplifier 50, and hence the voltage Vab between supply lines A and B, goes through zero volts. The output signal from the first zero crossing detector 60 is connected to another input line of the microcomputer 21. Resistor 62 couples the C phase supply line to the inverting inputs of the second differential amplifier 60 which has its non-inverting input connected by resistor 52 to the B phase supply line. This non-inverting input is also coupled to the circuit ground by resistor 63. A feedback resistor 64 is connected between the output of the second differential amplifier 60 and its inverting input. The output of the second differential amplifier 60 is connected to the non-inverting input of a third voltage comparator 65 whose inverting input is coupled to ground by resistor 66. The output of the third voltage comparator 65 is connected to another line of the microcomputer parallel input port. The level of this input indicates the polarity with respect to ground of the voltage Vbc between the B and C phase supply lines.

In addition the output of the second differential amplifier 60 is connected to the second zero crossing detector 68 which senses when the voltage output of the second differential amplifier 50, and hence the voltage Vbc between supply lines B and C, goes through zero volts. The output signal from the second zero crossing detector 68 is connected to yet another input line of the microcomputer 21.

Three terminals 41, 42, and 43 couple each of the stator windings 11-13 to the motor controller 20. Three equal value resistors 34-36 are coupled to terminals 41-43 in a Y connection with the common node 37 of the Y connected to the ground of the control circuit. The voltage across each resistor 34, 35, and 36 equals the voltage across each of the three stator windings 11, 12, and 13, respectively. The potential at the common node 37 of the Y resistor connection is the same as at the neutral node 15 of the motor windings, which is substantially equal to ground potential.

A first comparator 22 senses the voltage across the third stator winding 13. A pair of resistors 23 and 24 are connected in series between the third stator winding terminal 43 and circuit ground to form a voltage divider. The node of the voltage divider between the two resistors 23 and 24 in coupled to a non-inverting input of the first voltage comparator 22. This voltage divider reduces the third stator winding voltage Vc to a level compatible with the first comparator 22. The inverting input of this comparator 22 is connected directly to the circuit ground. The comparator's output is connected to a parallel input port line of the microcomputer 21.

Additional input port lines of the microcomputer 21 are connected to two manual pushbutton switches 71 and 72. These input port lines are also coupled by a pair of pull-up resistors 74 and 76 to a positive supply voltage V+ for the motor controller 20. Activation of switches 71 and 72 pulls the corresponding microcomputer input line to ground. The first switch 71 is activated to start the motor 10 and the second switch 72 initiates the motor braking function, as will be described.

When the user wishes to start the motor, switch 71 is closed momentarily, signaling the microcomputer 21 to begin executing a conventional motor starting software routine. The SCR pairs are triggered in a defined circular sequence according to the phase relationships of the voltage on the three supply lines. The software routine gradually triggers each of the SCR pairs 16-18 successively earlier in each half-cycle of the voltage on the phase line A, B or C to which each SCR pair is coupled. Eventually, each of the SCR pairs will be triggered to be conductive for substantially the entire half-cycle of the supply line voltage during which they are forward biased. When this occurs, the motor has substantially reached its full operating speed. Thereafter the SCR pairs continue to be triggered into a conductive state for essentially each entire half-cycle of the associated phase voltage.

By momentarily closing switch 72, the user initiates a motor controller braking maneuver to stop the motor quicker than by simply disconnecting the electricity. The braking maneuver involves applying current pulses to the motor 10 at specific times to generate an electromagnetic field which produces a negative motor torque thereby slowing the motor's rotor. It has been determined that this can be achieved by applying the alternating electricity when the polarity of the instantaneous supply voltage for two stator windings 11, 12 or 13 is opposite to the polarity of the back electromotive force (emf) induced voltage (i.e. one of these voltages is positive and the other is negative with respect to ground potential). The back emf results from the magnetism of the rotor and the rotating magnetic field produced by that magnetism as the rotor slows. As used herein, the terms "back emf voltage" and "back emf induced voltage" refer to the voltage induced in a winding of the motor by this rotating magnetic field during periods when electricity from the supply lines is not being applied to the motor.

Specifically, referring to FIG. 1, the back emf voltage Vc induced across the third stator coil 13 is sensed by voltage comparator 22. The output of this voltage comparator essentially represents the polarity of the sensed back emf voltage as referenced to circuit ground potential. The polarity of the alternating supply voltage Vab between phase lines A and B is sensed by the second voltage comparator 55. After each zero voltage crossing of the supply voltage Vab as sensed by detector 60, the microcomputer 21 examines the polarity of the two sensed voltage samples. If the polarities are opposite and the motor is at a relatively high speed, the pairs of SCR's 16 and 17 for the A and B supply lines are triggered by a short pulse applied to their gate electrodes after a fixed delay from the occurrence of the zero crossing. The delay can be set to any interval up to almost one half the period of the supply voltage. The shorter the delay the more current is applied to the motor and the greater the braking effect. When triggered, the pairs of SCR's 16 and 17 apply current to the motor until the alternating supply current Iab passes through zero amperes, at which point the SCR's automatically turn off until triggered again by the microcomputer 21.

Figure 2A:
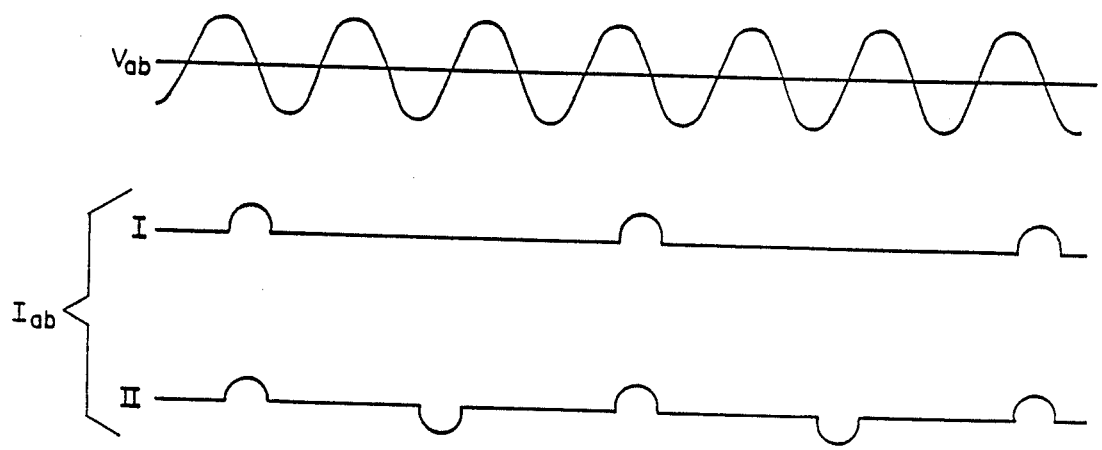
FIGS. 2A and B are conceptual illustrations of the waveforms of the voltage between the phase lines of the AC power and the back emf voltage across the motor winding.

As the motor 10 slows down, the phase relationship changes between the back emf voltage Vc induced in stator winding 13 and the supply line voltage Vab. As a result, the pairs first and second SCR's 16 and 17 for phase lines A and B are triggered more and more frequently thereby increasing the braking force. Waveforms I and II of FIG. 2A conceptually illustrate the current Iab that flows through the first and second stator windings 11 and 12 at two progressively slower speeds during the braking. It should be understood that other waveform patterns exist than just the ones illustrated.

In current waveform I, the first and second pairs of SCR's 16 and 17 are triggered only during an occasional positive half-cycle of the supply line voltage Vab. As the motor slows to approximately fifty percent of its full operating speed, additional triggering occurs during occasional negative half cycles between the positive half cycle triggering as shown by waveform II. At this time the SCR's for phase lines A and B are being triggered every third half-cycle of the alternating supply line voltage. This occurrence provides an indication that the motor speed has been reduced to about fifty percent.

When this degree of speed reduction has occurred, the microcomputer 21 switches from triggering the first and second SCR pairs 16 an 17 to using the second and third SCR pairs 17 and 18 for phase B and C supply lines to apply the electricity to stator windings 12 and 13 to slow the motor. Whereas continuing to apply the electricity to the first and second stator windings 11 and 12 eventually will produce an occasional burst of positive motor torque, changing the stator windings used eliminates such bursts. However, in order to determine when to apply the electricity to the second and third stator windings 12 and 13, the polarity of the voltage between phase lines B and C that are associated with those windings must be compared to the back emf voltage polarity.

Figure 2B:
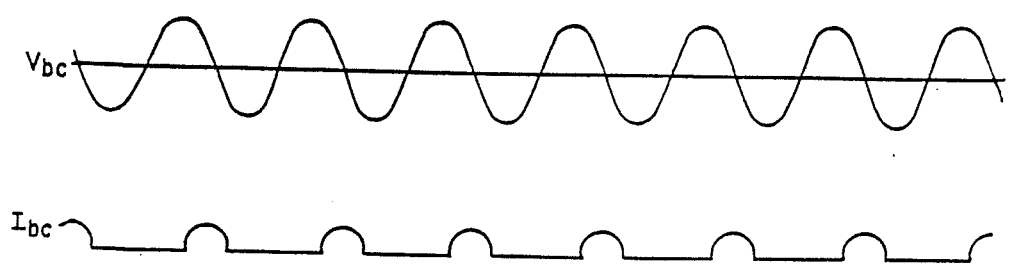

Continued slowing of the motor 10 results in the SCR's for phase lines B and C being triggered during every cycle of the supply line voltage Vbc as illustrated by waveforms in FIG. 2B. Although this waveform shows triggering during the positive half cycles, this latter triggering can occur during either positive or negative half cycles. When the SCR pairs are being triggered during every cycle of the supply voltage, the motor 10 is very close to a complete stop and a short interval thereafter the SCR triggering can be terminated. Alternatively, one of several motor stoppage detection techniques, such as the one described in U.S. patent application Ser. No. 07/343,439, may be used to determine when to terminate the application of electricity to the motor.

Figure 3A:
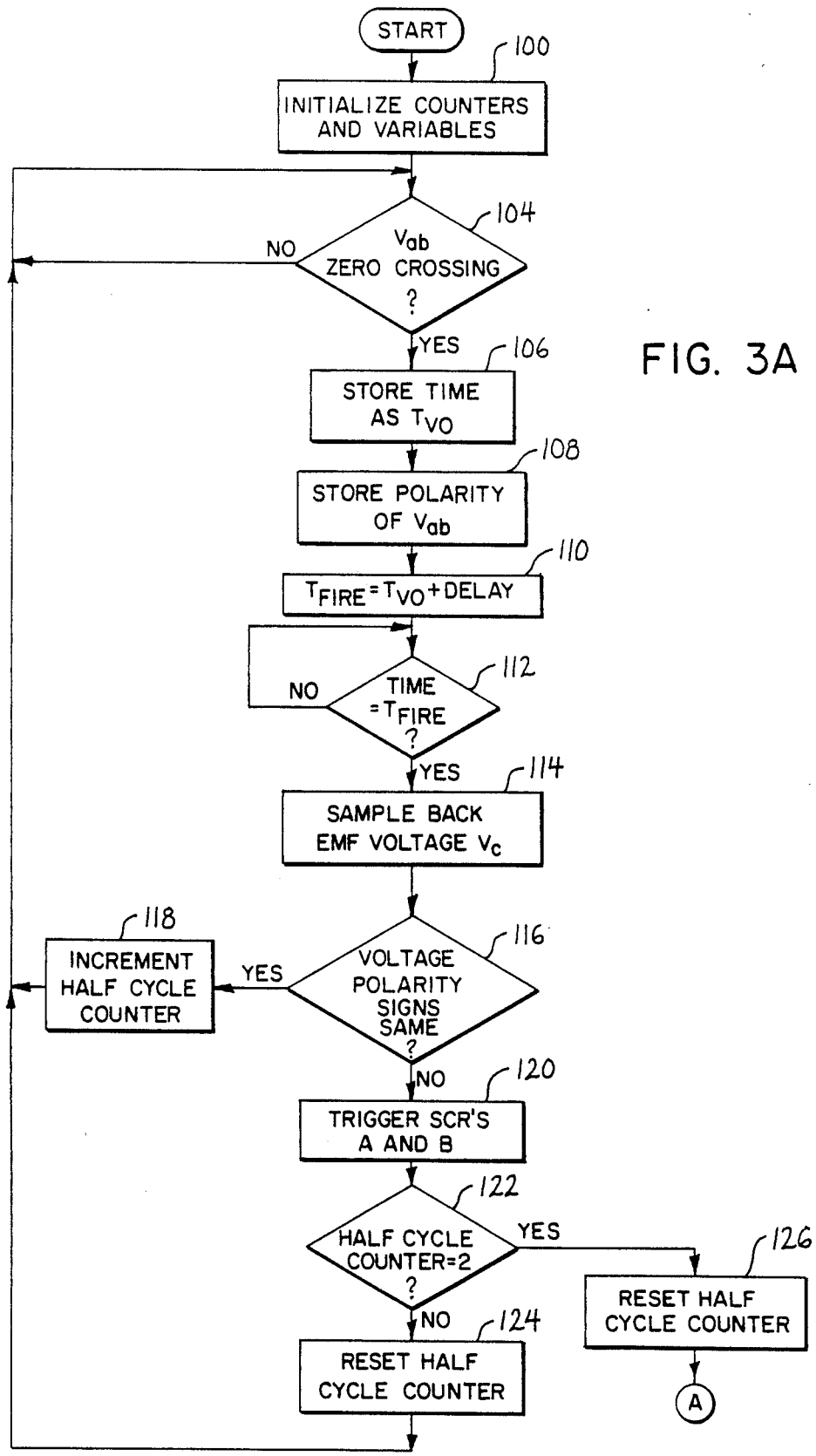
FIGS. 3A and B form a flowchart of the controller's operation to brake the motor.

The present maneuver for stopping the motor is implemented in a software routine for the microcomputer 21 of the controller 20 illustrated in FIG. 1. With additional reference to FIG. 3A, the software routine begins at step 100 with microcomputer 21 initializing memory locations that contain the values of variables and counters used in the routine. Once initialization is complete, the microcomputer 21 checks the input from the first zero crossing detector 58 at step 104 to determine if a zero crossing of the voltage between phase lines A and B has occurred. If this crossing has not happened, the program execution loops continually checking the first zero crossing detector 58.

Whenever this voltage crossing occurs, the microcomputer 21 loads the present value (TIME) of its interval timer into a memory location designated $T_{vo}$ at step 106 to store the time at which the zero crossing occurred. Then at step 108, the polarity of the instantaneous voltage between the A and B phase lines (as sensed by first voltage comparator 55) is stored in the microcomputer memory. A constant delay interval is added to the stored zero crossing time $T_{vo}$ at step 110 to determine the time ($T_{FIRE}$) at which trigger the SCR pairs 16 and 17 COupled to the A and B phase lines in order to generate a negative motor torque. The shorter the delay the sooner in the voltage half cycle the SCR's will be triggered and the stronger the braking force. A minimum delay is provided to insure that the SCR's will not be triggered until the alternating current through them from the previous triggering has gone to zero and the SCR's have turned off.

Thereafter, the microcomputer timer value (TIME) is compared repeatedly to the triggering time ($T_{FIRE}$) at step 112. When it is time to trigger the SCR's, the program execution advances to step 114 where the microcomputer 21 examines the input level from voltage comparator 22 to detect the polarity of the back emf voltage $V_c$ induced across the third stator winding 13. Since the sensing of the back emf induced voltage occurs at time ($T_{FIRE}$), but prior to triggering the SCR's, the voltage is sensed when electricity from the supply is not flowing through the motor 10. This insures that the voltage being sensed across the third stator winding 13 is produced solely by the back emf and not due to inductive coupling of the supply current Iab flowing through stator windings 11 and 12

The program execution then advances to step 116 where the polarity of the sensed back emf voltage Vc is compared to the polarity of the voltage Vab between phase lines A and B stored previously at step 108. If these polarities are the same, that is the voltages are both positive or both negative with respect to ground potential, a half-cycle counter in the microcomputer memory is incremented at step 118. This counter tabulates the number of half-cycles of the supply voltage, and thereby the amount of time, which occur between triggering the SCR's. Then the program returns to step 104 to await another zero supply voltage crossing.

However, if the polarity of the sensed back emf voltage Vc is opposite to the polarity of the voltage Vab across phase lines A and B the program execution advances to step 120. There, the first and second SCR pairs 16 and 17 are triggered by the microcomputer 21 applying a brief pulse to their gate electrodes via output lines 26 and 27 and transformers 31 and 32. This triggering renders conductive the forward biased SCR's in pairs 16 and 17 thereby sending a current Iab through the first and second stator coils 11 and 12. The current Iab generates an electromagnetic field that interacts with the magnetic field from the rotor to slow the rotor. Specifically, SCR pairs 16 and 17 are triggered at times when the electromagnetic field interaction will produce a negative torque in the motor. Once triggered, the SCR's remain conductive until the alternating current Iab goes to zero. Then, the SCR's turn off and remain so until triggered again.

Following the triggering of the SCR's, the microcomputer 21 makes a determination as to whether the SCR's are being triggered during every third half-cycle of the supply line voltage. This occurrence indicated by the half-cycle counter having a value of two when it is read at step 122. When the motor braking commences, the relatively high speed results in the specified voltage polarity relationship occurring only once every several supply voltage cycles. Therefore the half cycle counter will have a value that is greater than two when it is examined at step 122. In this case the program execution advances to step 124, where the half cycle counter is reset to zero before the program execution returns to step 104 to await another zero crossing of the voltage Vab across phase lines A and B.

Eventually, the motor 10 will slow down to approximately fifty percent of its full operating speed prior to the initiation of the braking. At this time the first and second SCR pairs 16 and 17 will be triggered during every third half cycle of the voltage between phase lines A and B as depicted in waveform II of FIG. 2A.

When this first occurs, the half-cycle counter value examined at step 122 will equal two, as two incrementations of the counter where made at step 118 since the last time the voltage Vab and the back emf voltage Vc had opposite polarities. When the half cycle counter equals two at step 122, the program execution branches to step 26 where the half cycle counter is reset to zero As noted above triggering the SCR's to send current through the first and second stator winding 11 and 12 in response to the back emf sensed in the third stator winding 13 consistently produces a negative torque at higher motor speeds during braking. However this application of current occasionally produces bursts of positive torque at lower speeds. Therefore at an intermediate speed a transition is made to applying current from the B and C supply lines through the second and third stator winds 12 and 13 to further reduce the motor speed. In the preferred embodiment, this intermediate speed at which the transition occur is approximately fifty percent of the full speed of the motor. The approximate speed is indicated by the first and second SCR pairs 16 and 17 being triggered every third half cycle of the supply voltage. However, not only can the transition occur at another intermediate speed, but different techniques may be employed to detect that speed. For example a timer, such as the microcomputer timer, can be used to measure the interval between SCR triggering. When the interval decreases below a given length (e.g. 25 milliseconds) the transition can occur.

Figure 3B:
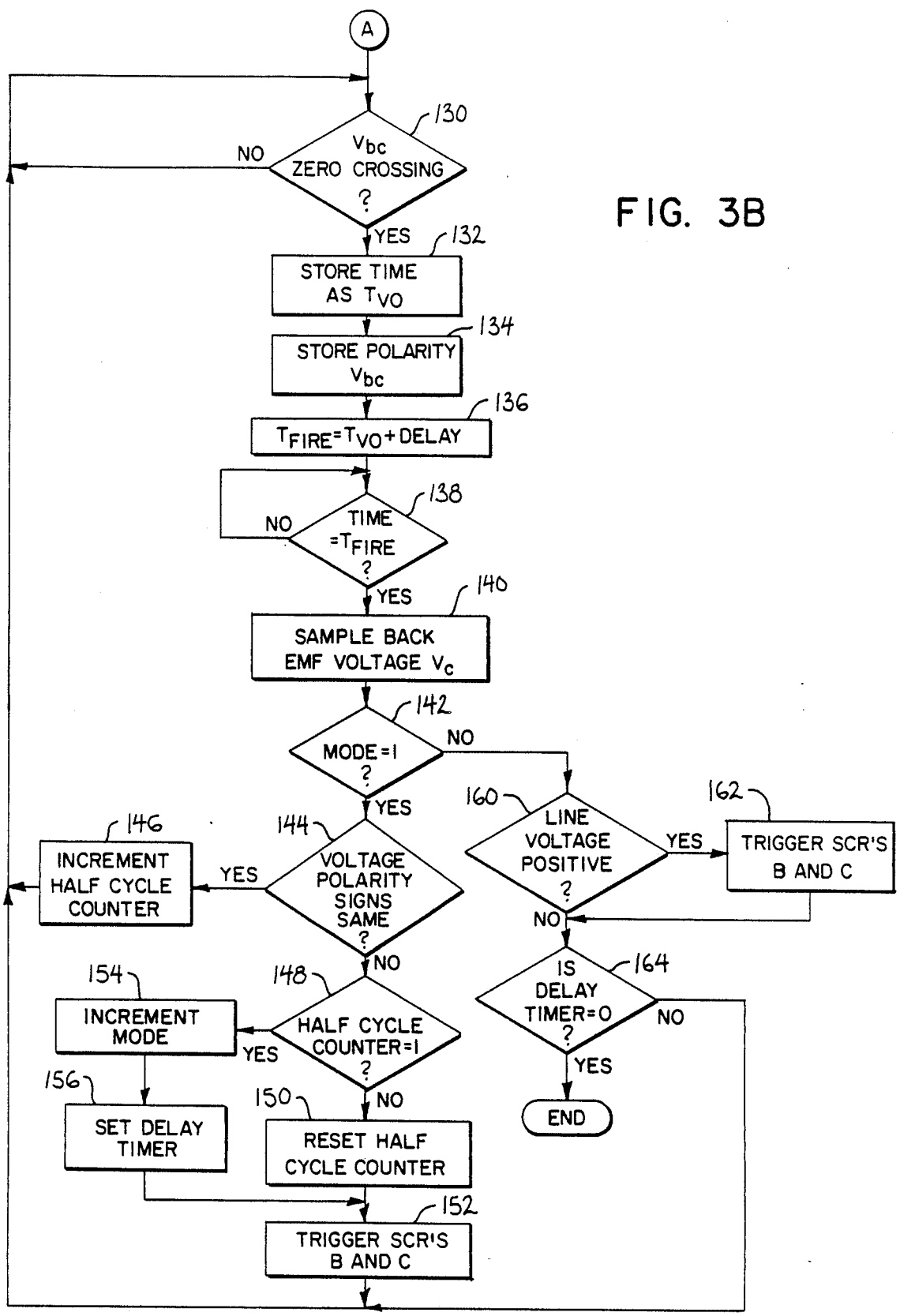

At the transition the program execution advances to step 130 on FIG. 3B where the microcomputer checks the input from the second zero crossing detector 68 to detect when the voltage Vbc across supply lines B and C goes to zero. Alternatively, as the phases of the voltage between different supply lines have a fixed time relationship, the zero crossing of voltage Vbc can be determined from the zero crossing of voltage Vab. The execution remains at step 130 until a zero crossing of voltage Vbc is detected. Thereupon the microcomputer 21 executes steps 132–140 which are similar to steps 106–114 in determining when to trigger the SCR's. However, the latter group of steps sense the polarity of the voltage across phase lines B and C to determine when to trigger the second and third pairs of SCR's 17 and 18 and apply current through stator winding 12 and 13.

At step 142, a check of a flag designated MODE is made to determine if the braking routine is in a final stage of bringing the motor to a stop. Initially this flag will be zero and the program execution will advance to step 144 where the polarity relationship between the back emf voltage Vc and the voltage Vbc across the B and C supply lines is determined. If these polarities are the same, the half cycle counter is incremented at step 146 before returning to step 130 to await another zero crossing of the supply voltage Vbc. Otherwise, if the specified polarities are opposite to one another, the program execution advances to step 148.

As the program execution advances, the half cycle counter is inspected. Initially the half cycle counter will have a value greater than one as more that one half-cycle of the supply voltage Vbc will occur between SCR triggerings. As a result, the program execution by the microcomputer 21 advances to step 150 where the half cycle counter is reset before the second and third SCR pairs 17 and 18 for the B and C phase lines are triggered at step 152. This applies a current through the second and third stator windings 12 and 13 to create a negative motor torque. Specifically the current produces an electromagnetic field in the motor at a slightly different time after the detection of the opposing voltage polarity condition, than when current Iab was sent through stator windings 12 and 13. This latter current application produces an electromagnetic field that is better timed at lower speeds to the rotating magnetic field of the rotor. As a consequence the application of current to the second and third stator windings 12 and 13 improves the braking effect in the latter portion of the motor stopping.

Eventually the triggering will occur during every other half-cycle of the supply voltage Vbc (either during every positive or every negative half-cycle) as the motor slows to approximately thirty percent of the full operating speed. When this occurs the half cycle counter will have a value of one when it is inspected by the microcomputer 21 at step 148. At this time the program enters the continuous firing mode where the second and third SCR pairs 17 and 18 are fired during every supply voltage cycle regardless of the back emf polarity. The first time that the SCR's are triggered during every other voltage cycle, the MODE variable is incremented at step 154. A delay timer then is loaded with a delay period and started at step 156 to provide an indication of how much longer the application of electricity to brake the motor should continue. Then the two SCR pairs 17 and 18 for phase lines B and C are triggered at step 152.

Thereafter, the program execution branches every time from decision block 142 to the step 160 of the continuous firing mode branch in which the second and third SCR pairs 17 and 18 are triggered during every positive half-cycle of the supply voltage Vbc regardless of the back emf voltage. The selection of the positive half cycle is arbitrary and every negative half-cycle could have been used. At the beginning of this program branch, the microcomputer 21 examines the output of the voltage comparator 65 to determine if the supply voltage Vbc across the B and C phase lines is positive with respect to the supply neutral, or ground. If the supply voltage is positive, the second and third SCR pairs 17 and 18 are triggered at step 162 before advancing to step 164. Otherwise during the negative half-cycle of the supply voltage Vbc, the program execution advances directly from step 160 to step 164. At this time the delay timer is checked to determine if the braking process should be terminated. If the process is to continue the program execution by the microcomputer 21 returns to step 130.

We claim:

1. An apparatus for controlling an electric motor which has first, second and third windings supplied by a source of alternating voltage having three phases A, B and C, said apparatus comprising:

first, second and third switch means respectively coupling the first, second and third windings to the three phases A, B and C of the source when said switch means are rendered conductive by trigger signals; and means for applying trigger signals to said switch means to produce a negative motor torque wherein:

when the speed of the motor is above a first predefined level, trigger signals are applied to said first and second switch means in response to the polarity of the voltage between phases A and B being opposed to the polarity of back emf voltage induced across said third winding, and when the speed of the motor is below the first predefined level, trigger signals are applied to said second and third switch means in response to the polarity of the voltage between phases B and C being opposed to the polarity of back emf voltage induced across said third winding.

2. The apparatus as recited in claim 1 further comprising a means for detecting the relationship of the speed of the motor to the first predefined level.

3. The apparatus as recited in claim 2 wherein said means for detecting the relationship comprises means for determining the interval of time, which elapses between applying trigger signals to said switch means.

4. The apparatus as recited in claim 2 wherein said first means for detecting the relationship comprises means for counting the number of half-cycles of the alternating voltage from the source, which occur between applying trigger signals to said switch means.

5. The apparatus as recited in claim 1 further comprising a third means for applying trigger signals to a pair of said switch means during every cycle of the alternating voltage from the source regardless of the back emf voltage, when the speed of the motor is below a second predefined level that is slower than the first predefined level.

6. The apparatus as recited in claim 5 further comprising means for determining the interval of time which elapses between applying trigger signals to said switch means, in order to detect the relationship of the speed of the motor to the second predefined level.

7. The apparatus recited in claim 5 further comprising means for counting the number of half-cycles of the alternating voltage from the source which occur between applying trigger signals to said switch means, in order to detect the relationship of the speed of the motor to the second predefined level.

8. An apparatus for reducing the speed of an electric motor which has first, second and third windings supplied by a source of alternating voltage having three phases A, B and C, said apparatus comprising:

first, second and third switch means respectively coupling the first, second and third windings to the three phases A, B and C of the source when said switch means are rendered conductive by separate trigger signals;

a first means for sensing the polarity of the back emf voltage induced across said third winding of the motor;

a second means for sensing the polarity of the voltage between phases A and B of the source;

a third means for sensing the polarity of the voltage between phases B and C of the source;

a first means, responsive to the first and second means for sensing, for applying trigger signals to said first and second switch means in response to the polarity of the voltage between phases A and B being opposed to the polarity of back emf voltage induced across said third winding when the speed of the motor is above a first predefined level; and a second means, responsive to the first and third means for sensing, for applying trigger signals to said second and third switch means in response to the polarity of the voltage between phases B and C being opposed to the polarity of back emf voltage induced across said third winding when the speed of the motor is below the first predefined level.

9. The apparatus as recited in claim 8 further comprising means for determining the interval of time which elapses between applying trigger signals to said first and second switch means, in order to detect when the speed of the motor is above the first predefined level.

10. The apparatus as recited in claim 8 further comprising means for counting the number of half-cycles of the alternating voltage between phases A and B of the source, in order to detect when the speed of the motor is above the first predefined level.

11. The apparatus as recited in claim 8 further comprising a third means for applying trigger signals to said second and third switch means during every cycle of the alternating voltage between phases B and C of the source, when the speed of the motor is below a second predefined level that is slower than the first predefined level.

12. The apparatus recited in claim 11 further comprising means for determining the interval of time, which elapses between applying trigger signals to said second and third switch means, in order to detect when the speed of the motor is above the second predefined level.

13. The apparatus recited in claim 11 further comprising means for counting the number of half-cycles of the alternating voltage between phases B and C of the source, which occur between applying trigger signals to said second and third switch means, in order to detect when the speed of the motor is above the second predefined level.

14. A method for reducing the speed of an electric motor which has first, second and third windings coupled respectively to three phases A, B and C of alternating voltage by first, second and third switch means when said switch means are rendered conductive by trigger signals; said method comprising:

sensing the polarity of the back emf voltage induced across said third winding of the motor;

sensing the polarity of the voltage between phases A and B of the source;

sensing the polarity of the voltage between phases B and C of the source;

applying trigger signals to said first and second switch means when both the polarity of the voltage between phases A and B is opposed to the polarity of back emf voltage induced across the third winding and the speed of the motor is above a first predefined level; and applying trigger signals to said second and third switch means when both the polarity of the voltage between phases B and C is opposed to the polarity of back emf voltage induced across said third winding and the speed of the motor is below the first predefined level.

15. The method as recited in claim 14 further comprising determining the interval of time which elapses between applying trigger signals to said first and second switch means, in order to detect the relationship of the speed of the motor to the first predefined level.

16. The method as recited in claim 14 further comprising applying trigger signals to said second and third switch means during every cycle of the alternating voltage between phases B and C, when the speed of the motor is below a second predefined level that is slower than the first predefined level.

17. The method as recited in claim 14 further comprising applying trigger signals to a pair of said switch means during every cycle of the alternating voltage when the speed of the motor is below a second predefined level that is slower than the first predefined level.

* * * * *